(No Model.) 2 Sheets—Sheet 2.

D. UHLHORN, Jr.
MILL FOR HULLING GRAIN.

No. 322,080. Patented July 14, 1885.

UNITED STATES PATENT OFFICE.

DIEDRICH UHLHORN, JR., OF GREVENBROICH, GERMANY.

MILL FOR HULLING GRAIN.

SPECIFICATION forming part of Letters Patent No. 322,080, dated July 14, 1885.

Application filed January 2, 1885. (No model.) Patented in France January 10, 1884, No. 159,644; in Belgium January 31, 1884, No. 63,780; in England February 4, 1884, No. 2,094; in Sweden March 20, 1884; in Austria-Hungary April 24, 1884, No. 2,176 and No. 18,206; in Germany May 9, 1884, No. 27,984, and in Norway May 16, 1884.

*To all whom it may concern:*

Be it known that I, DIEDRICH UHLHORN, Jr., a subject of the Emperor of Germany, residing in Grevenbroich, Germany, have invented certain new and useful Improvements in Mills for Hulling Grain, of which the following is a specification.

My invention relates to mills for husking or hulling grain, in which the husks are removed from the grain by the friction between the grains themselves and against the rubbing-surfaces of millstones.

Figure 1:
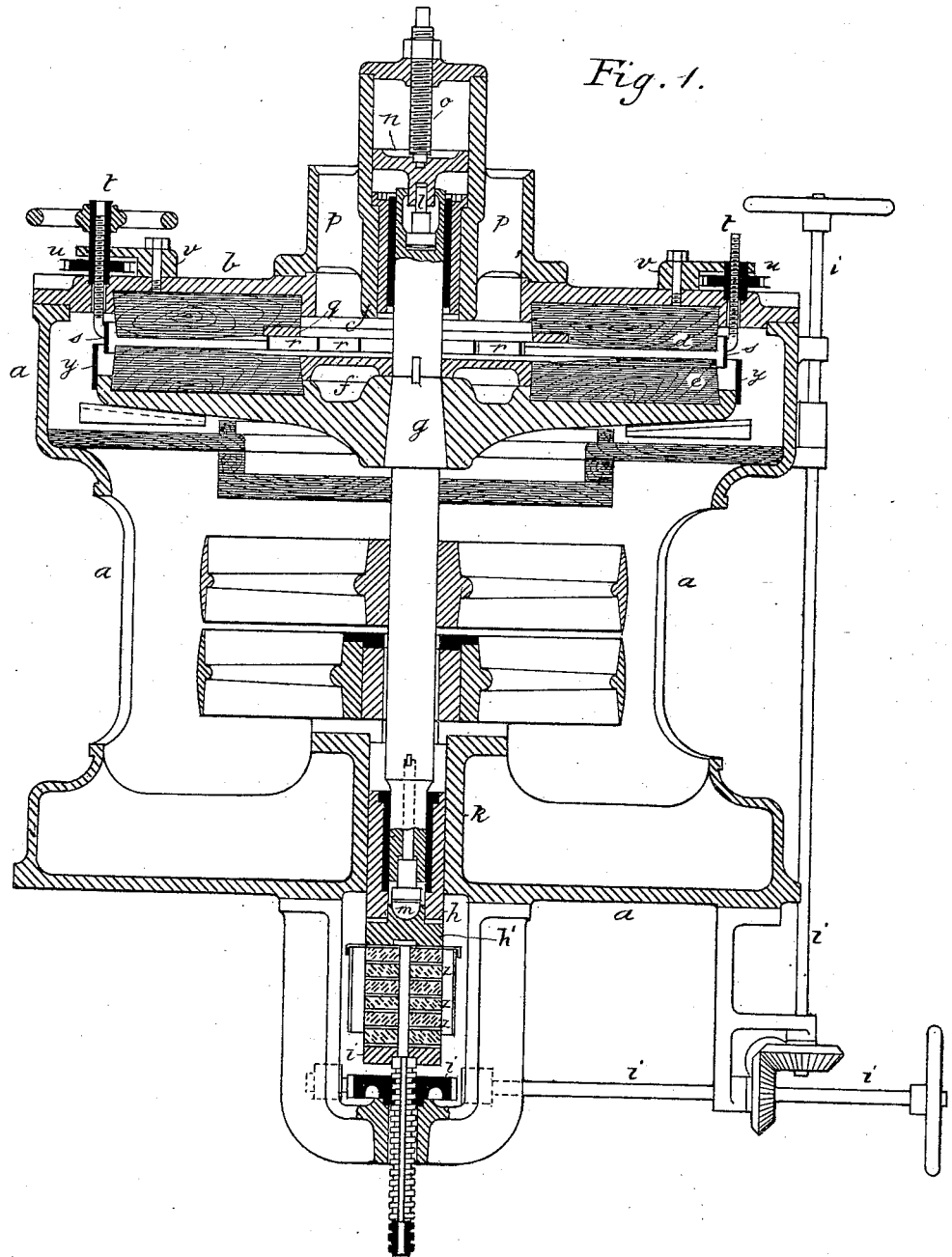
Figure 2:
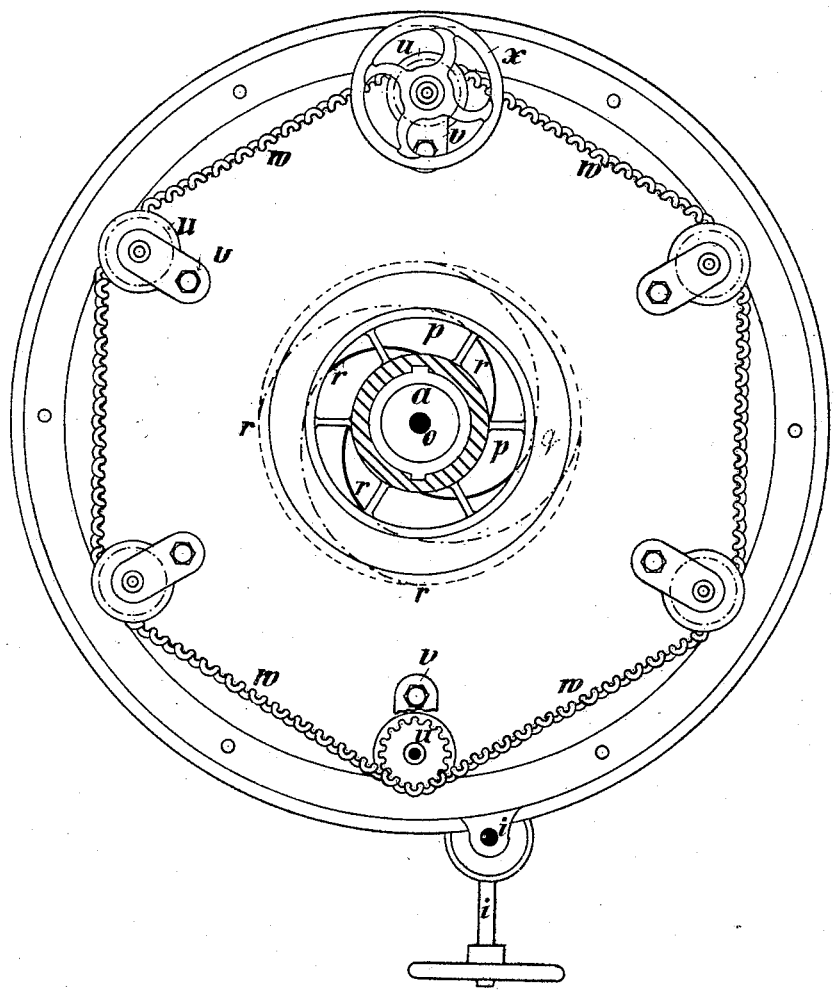

The accompanying drawings are an illustration of my invention, Figure 1 being a vertical section, and Fig. 2 a horizontal section, of a hulling-mill.

My improved mill consists of a cast-iron frame, $a$, to the upper part of which is bolted an inverted millstone-case, $b$, preferably of cast-iron, in which an upper or fixed millstone, $d$, is cemented and bolted, face downward. The lower or running millstone, $e$, is also secured, face upward, in a similar case, $f$, which is firmly keyed and secured upon a vertical central revolving spindle, $g$, driven by a belt or other convenient means, and the lower end of which has a step-bearing, $m$, which is inclosed in a sleeve, $h$, that is adjustable in a central opening of a fixed casing, $k$. The upper end of the spindle $g$ revolves in a casing, $c$, fixed upon the upper side of the upper millstone-case, $b$, the said spindle being provided with a gudgeon, $l$, which turns in a plate, $n$, attached to said casing. The upward movement of said plate is limited by means of a screw, $o$, to regulate the height to which said gudgeon can rise.

The grain to be hulled is previously moistened with water and is delivered by a device of the ordinary well-known kind through an aperture, $p$, in the top of the upper millstone-case and through the millstone upon the lower one, $e$. The grains are then driven by centrifugal force between the roughened surfaces of the two millstones, or their equivalents, this movement being aided by helicoidal-shaped distributing-arms $r\ r$, arranged round the eye of the lower stone, and in this way the whole of the husks are quickly removed by the friction of the grains between themselves and against the rubbing-surfaces.

In order to prevent the husked grain from too soon leaving the millstones, I arrange an adjustable ring, $s$, of metal, round and near their peripheries, this ring having riveted to it a sufficient number—preferably six—of vertical screws, $t\ t\ t$, which are fitted in nuts forming the centers of a corresponding number of horizontal wheels, $u\ u$, turning in bearings bolted to the top of the upper millstone-case, $b$, by the brackets $v$. The peripheries of these wheels are provided with teeth, and an endless chain, $w$, passes round and gears with the teeth of all the wheels $u$, so that when one of the wheels is turned round the chain $w$ causes all the other wheels to turn simultaneously, and the whole of the screws $t$ are raised or lowered, together with the ring $s$, to which they are riveted, and the exact height of the latter is thus adjusted. A handle or hand-wheel, $x$, is fitted to one of the wheels $u$ for the purpose of turning it round. An outer ring, $y$, of somewhat greater diameter, the lower edge of which is fixed to the lower case, may sometimes be used to assist in retarding the discharge of the grain from between the stones. The lower step-bearing, $m$, for the revolving spindle $g$ turns in and on a recessed support, $h'$, and is provided at $i\ i$ with a lifting device consisting of a screw, by which its height can be adjusted by means of a nut fitting upon it and turned by beveled toothed wheels and shafts actuated by a handle in any convenient position; and between the step and their adjusting-screw are arranged india-rubber disks $z\ z$, or metal springs, which become somewhat compressed as soon as the pressure between the rubbing-surfaces becomes too great, and the discharge of the grain is thus facilitated.

Instead of stones, as described, hard and rough wood or other suitable material may be employed.

I claim as my invention—

1. The combination of the stones and the ring $s$, which regulates the discharge of grain, with a series of adjusting-screws attached thereto, a series of nuts whereby said screws are operated, and means for actuating said nuts simultaneously to adjust said ring at all points, substantially as set forth.

2. The combination of the stones and regulating-ring s with the screws t, attached thereto, the gear-wheels u, provided with nuts which fit on said screws, the chain w, in contact with said gear-wheels, and the hand-wheel for operating said chain, substantially as set forth.

3. The combination of ring y, attached to one of the millstones, with ring s, in proximity to the other millstone, and devices for adjusting the latter ring, substantially as set forth.

In witness whereof I have hereunto signed my name in the presence of two subscribing witnesses.

DIEDRICH UHLHORN, Jr.

Witnesses:
GEORG KRETZER,
JACOB WAGNER.